United States Patent [19]

Ebina et al.

[11] Patent Number: 5,594,920
[45] Date of Patent: Jan. 14, 1997

[54] POINT-OF-SALE TERMINAL AND PRINTING APPARATUS THEREFOR

[75] Inventors: Kouichi Ebina; Ikuo Ito; Kazuaki Kasai, all of Suwa, Japan

[73] Assignee: Seiko Epson Corporation, Tokyo, Japan

[21] Appl. No.: 344,242

[22] Filed: Nov. 23, 1994

[30] Foreign Application Priority Data

Nov. 24, 1993 [JP] Japan .................................. 5-293556

[51] Int. Cl.⁶ ............................ G07G 1/12; G06F 15/00; G06F 13/00
[52] U.S. Cl. .......................... 395/224; 235/7 R; 395/821
[58] Field of Search ...................................... 395/821, 101, 395/800; 235/7 R, 379, 380; 400/70; 364/405, 408

[56] References Cited

U.S. PATENT DOCUMENTS

| | | | |
|---|---|---|---|
| 3,899,775 | 8/1975 | Larsen | 364/405 |
| 4,398,250 | 8/1983 | Hosono | 364/404 |
| 4,508,462 | 4/1985 | Haruhara | 400/70 |
| 4,649,481 | 3/1987 | Takahashi | 364/405 |
| 4,841,442 | 6/1989 | Hosoyama | 364/405 |
| 5,214,750 | 5/1993 | Minowa et al. | 395/111 |
| 5,253,163 | 10/1993 | Yoshida | 364/405 |
| 5,253,345 | 10/1993 | Fernandes et al. | 235/380 |
| 5,398,305 | 3/1995 | Yawata et al. | 395/101 |
| 5,412,761 | 5/1995 | Teradaira | 395/111 |
| 5,437,004 | 7/1995 | Miyasaka et al. | 395/111 |
| 5,489,773 | 2/1996 | Kumar | 235/462 |

FOREIGN PATENT DOCUMENTS

| | | | |
|---|---|---|---|
| 0400653 | 12/1990 | European Pat. Off. | G07G 1/12 |
| 2065350 | 6/1981 | United Kingdom | G07G 1/00 |

Primary Examiner—Gopal C. Ray
Attorney, Agent, or Firm—W. Glen Johnson

[57] ABSTRACT

A point-of-sale (POS) terminal is provided with a control device for sending control and/or print data to a printing apparatus. The control device includes a general purpose processor controlled by a general purpose operating system and a control device connector for connecting the control device to the printing apparatus. The printing apparatus comprises a first connector connecting the printing apparatus to the control device through the control device connector. A second connector connects the printing apparatus to an external device. A processor for processes first data input from the first connector and second data input from the second connector. The first connector is in communication with the second connector. The POS terminal also comprises a housing including a first body frame for accommodating the printing apparatus and a second body frame for accommodating the control device, the first body frame being detachably mounted on the second body frame.

17 Claims, 12 Drawing Sheets

POINT-OF-SALE TERMINAL AND PRINTING APPARATUS THEREFOR

BACKGROUND OF THE INVENTION

1. Field of the Invention

The present invention generally relates to point-of-sale or POS terminals. More particularly, the present invention relates to POS terminals in which a personal computer is employed as a control device for controlling a printer and any other peripheral equipment.

2. Description of the Background Art

Typically, a point-of-sale or POS terminal includes an input unit for accepting keyed or scanned data from sales personnel. Such data typically includes the name or type of product along with its selling price. The POS terminal may also comprise a control unit for generating data for display or to be printed in accordance with the data entered by the sales personnel. The conventional approach is to provide a dedicated POS terminal integrating all of these devices. The disadvantage to this approach is that such devices lacks versatility and expandability. As a result, these devices are less versatile and cannot conform to the changing needs of the user. Accordingly, the demand for these dedicated POS terminals is smaller, resulting in reduced production volumes. Consequently, manufacturer can not take advantage of large scale manufacturing economies, and these POS terminals tend to be high in cost. Moreover, such disadvantages become obstacles against computerization in the POS field.

In an attempt to solve the above-discussed problems, more efforts are being made toward the development of POS terminals that utilize general-purpose computers or, more specifically, personal computers (PC's), as the control unit. These systems are referred to as PC-POS systems, and the display module and printer are connected to the PC via a general-purpose interface. In a PC-POS system, the same hardware can be configured for various types of applications by employing the appropriate software. Furthermore, by using a commercially available printed circuit board set, the PC that makes up the control unit can be configured inexpensively, and its functions can be easily expanded. Therefore, PC-POS systems are quite effective for computerizing the POS field.

A POS terminal is usually installed inside a store, particularly on a counter where accounting transactions take place. As such, the counter space occupied by the POS terminal should be as small as possible. Accordingly, the inventors have developed a PC-POS system based on a novel concept, which reduces the area occupied by the POS terminal through a design in which the control unit is housed inside a body frame possessing the same footprint as the printer, allowing the placement of this body frame below the printer.

FIG. 13 illustrates a connection of a conventional PC-POS with a general-purpose interface provided in the PC. As shown therein, the conventional PC-POS terminal comprises a control unit or device 62, a display unit or module 60 and a printer 61. In this configuration, control unit 62 provides data to display module 60. Display module 60 is equipped with a pass-through function. In other words, the pass-through function of display unit 60 does not forward a command data or display data sent by control unit 62 to printer 61, if the command or the display data is intended only for the display module itself. Alternatively, display unit 60 sends the command or print data to printer 61, if the command or print data is intended for printer 61. As shown in the FIG. 13, in this type of PC-POS terminal, the data from control unit 62 is input into display module 60, and the data output by display module 60 is then input into printer 61. The decision as to whether the data from control unit 62 should be displayed on display module 60 or printed by printer 61 is made by sending device selection data, along with data such as the total price, from control unit 62. This device selection data is recognized by either display module 60 or printer 61, and the data is displayed or printed. In this way, control unit 62 can control both a display module and a printer using a general-purpose interface.

In such a PC-POS system, because display module 60 relays the interface signals from a host computer, i.e., control unit 62, to printer 61, the interface cable connecting control unit 62 to printer 61 first connects control unit 62 to display module 60, and then connects display module 60 to printer 61. Consequently, in view of this connection cable it is difficult to stack control unit 62 and printer 61, or otherwise place them together. Furthermore, when control unit 62 and printer 61 are placed together the connecting cable has a tendency to form a loop or coil. As such the cable is prone to external electrical noise and may lead to errors in printing operation.

The Objects of the Invention

It is an object of the present invention to over come the above-discussed problems.

It is an additional object of the present invention to provide a highly reliable PC-POS terminal.

It is a further object of the present invention to provide a PC-POS terminal having its control unit and printer in one integrated unit.

It is also an object of the present invention to provide a PC-POS terminal in which the connection cable is prevented from forming loops or coils.

SUMMARY OF THE INVENTION

According to this invention, a POS terminal is provided comprising a printing apparatus and a control device which sends data at least to the printing apparatus. The printing apparatus includes a first connecting means through which it exchanges data with the control device on a logical level, and a second connecting means through which it exchanges data with an external device. The printing apparatus is housed inside the first body frame in which both the first and second connecting means are installed. The control device possesses a data processing system driven by a general-purpose operating system, and a control device connecting means which is connected to the first connecting means. The control device is housed inside the second body frame in which the control device connecting means is installed and the second body frame is installed in the first body frame in a detachable manner so that both the body frames are integrated as a single unit. The control device connecting means is connected to the first connecting means.

According to an aspect of the present invention, the printing apparatus possesses a means of data processing and a means of verifying connection which detects the connection between the first connecting means and the control device connecting means, wherein the means of data processing blocks data input from at least the second connecting means when the means of verifying connection detects the connection between the first and control device connecting means.

According to another aspect of the present invention, the printing apparatus outputs the data that is input from at least the first connecting means to the means of data processing and the second connecting means.

According to a further aspect of the present invention, the printing apparatus additionally possesses a third connecting means for connecting a means of display, and outputs the data from the first connecting means to the third connecting means.

According to an additional aspect of the present invention, the printing apparatus possesses a first connecting means through which it exchanges data with an external control device on a logical level; a second connecting means through which it exchanges data with an external device; a means of verifying connection which detects the connection between the first connecting means and an external control device; a means of data processing which performs various data processing tasks, including the blocking of data from the second connecting means when the means of verifying connection detects the connection between the first connecting means and an external control device; and a body frame in which both the first and second connecting means are installed and which houses the components required for printing control, including the means of verifying connection and the means of data processing.

According to still another aspect of the present invention, the printing apparatus is housed inside the first body frame, and the control device is housed inside the second body frame. Furthermore, the second body frame is installed in the first body frame in a detachable manner so that both body frames are integrated as a single unit, and data is exchanged on a logical level. Therefore, the design of both the body frame and the connecting means allow the overall apparatus to be compact. Furthermore, because the control device is equipped with a means of data processing, which is driven by a general-purpose operating system, general-purpose applications can be installed.

According to still a further aspect of the present invention, the means of data processing, possessed by the printing apparatus, blocks data input from the second connecting means when the means of verifying connection detects the connection between the first and control device connecting means, thus giving higher priority to data from the control device connecting means than the second connecting means and preventing malfunction.

According to still an additional aspect of the present invention, the printing apparatus outputs the data input from at least the first connecting means to the means of data processing and the second connecting means, the means of data processing performing the desired arithmetic operation based on the data. The data can be displayed if, for example, a display module is connected to the second connecting means.

According to yet another aspect of the present invention, the printing apparatus possesses a third connecting means for connecting a means of display, and the data from the first connecting means, i.e., data from the control device, can be displayed on the means of display if a display module is connected to the third connecting means.

According to yet a further aspect of the present invention, the components required for printing control, including the means of verifying connection and the means of data processing, are housed in a body frame; and a first connecting means, through which data is exchanged with an external control device on a logical level, and a second connecting means, through which data is exchanged with external devices, are installed in this body frame. When it detects that an external control device is connected to the first connecting means, the means of verifying connection issues an instruction to the means of data processing. Based on this instruction, the means of data processing ensures that data is input only from the first connecting means and blocks data input from the second connecting means, thus preventing malfunction.

According to yet an additional aspect of the present invention, the printing apparatus outputs the data that is input from at least the first connector to both the means of data processing and the second connector, wherein the means of data processing performs the desired arithmetic operation based on the data. Furthermore, because the data can be displayed if, for example, a display module is connected to the second connector, the data that is not processed by the means of data processing can be directly output to the second connector, thus enabling high-speed processing.

According to still yet a further aspect of the present invention, the printing apparatus is equipped with a third connector for connecting the means of display, and the data from the first connector, i.e., data from the control device, can be displayed on the means of display if a display module is connected to the third connector, thus simplifying the connectors and the configuration of the means of display.

According to still yet a further aspect of the present invention, the components required for printing control, including the means of verifying connection and the means of data processing, are housed in a body frame, and the first connector and the second connector are installed in this body frame. When it detects that an external control device is connected to the first connector, the means of verifying connection issues an instruction to the means of data processing. Based on this instruction, the means of data processing ensures that data is input only from the first connector and blocks data input from the second connector. The first connector exchanges data only on a logical level, and thus its configuration can be simple. Furthermore, malfunctions are prevented even when an external control device and other external equipment are connected to the first and second connectors, thus ensuring correct operation.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings, wherein like numerals represent like parts.

DESCRIPTION OF THE PREFERRED EMBODIMENTS

Reference is now made to attached figures.

Figure 1:
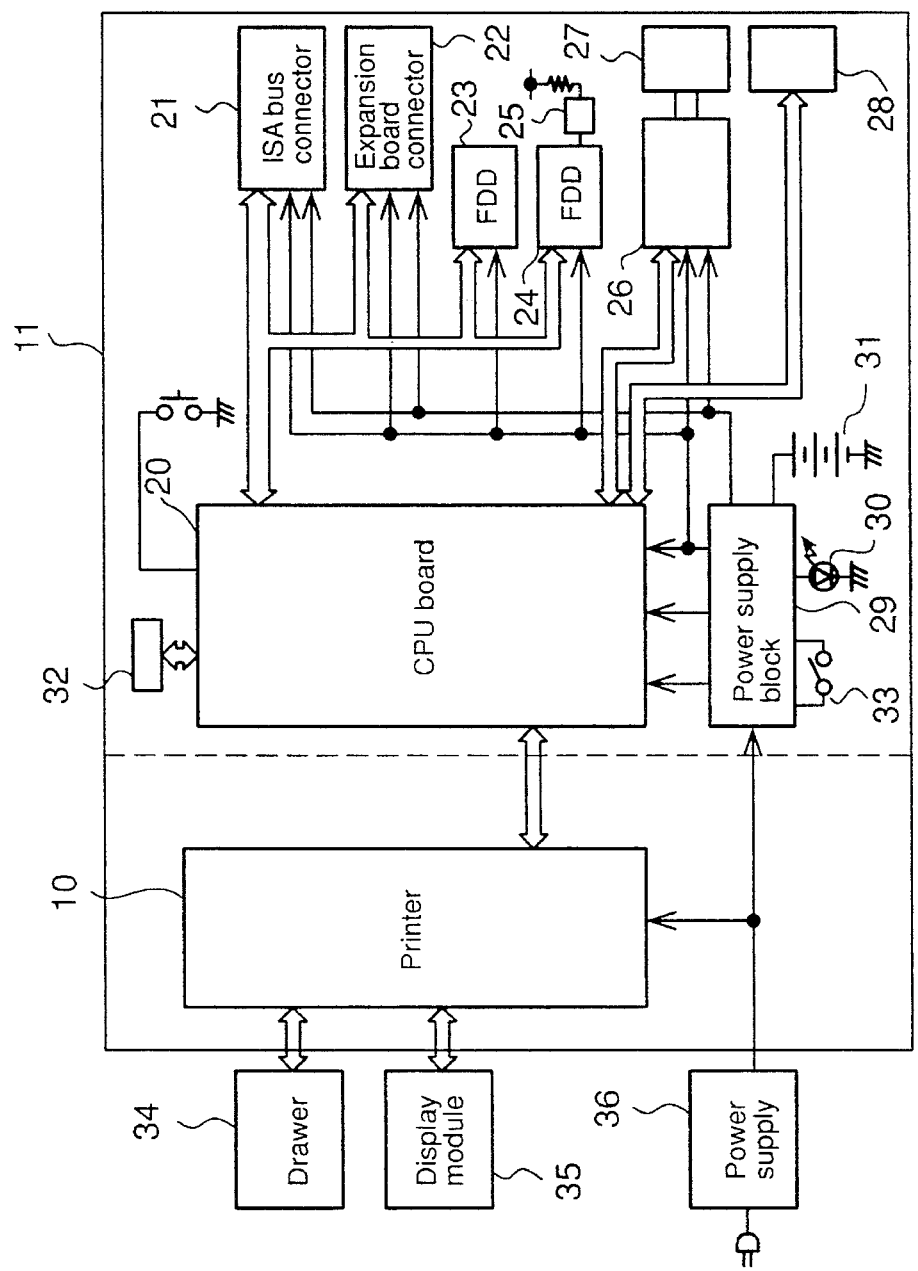
FIG. 1 is a block diagram of a configuration of a PC-POS terminal in accordance with an embodiment of the present invention.
Figure 2:
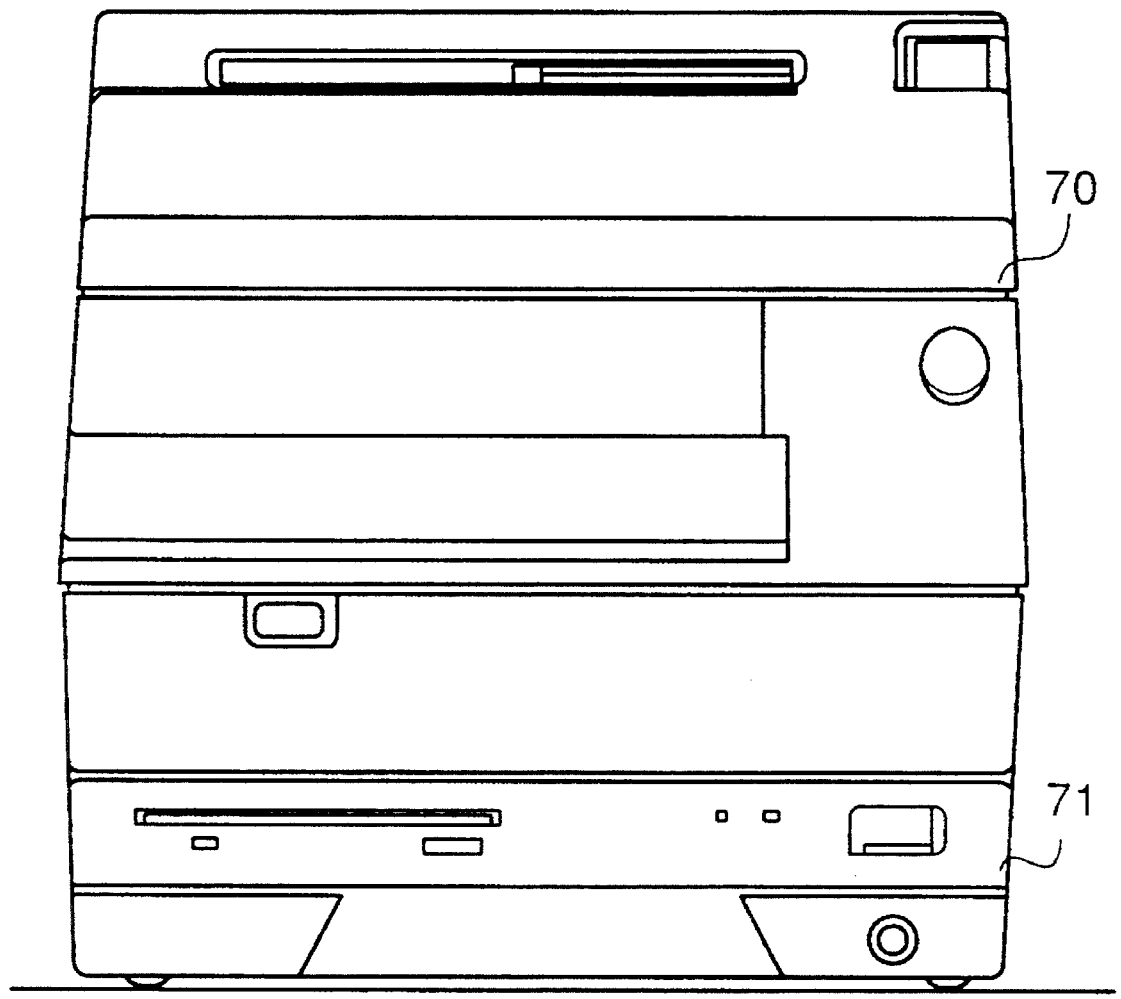
FIG. 2 is a front view showing the exterior of the PC-POS terminal of FIG. 1.
Figure 3:
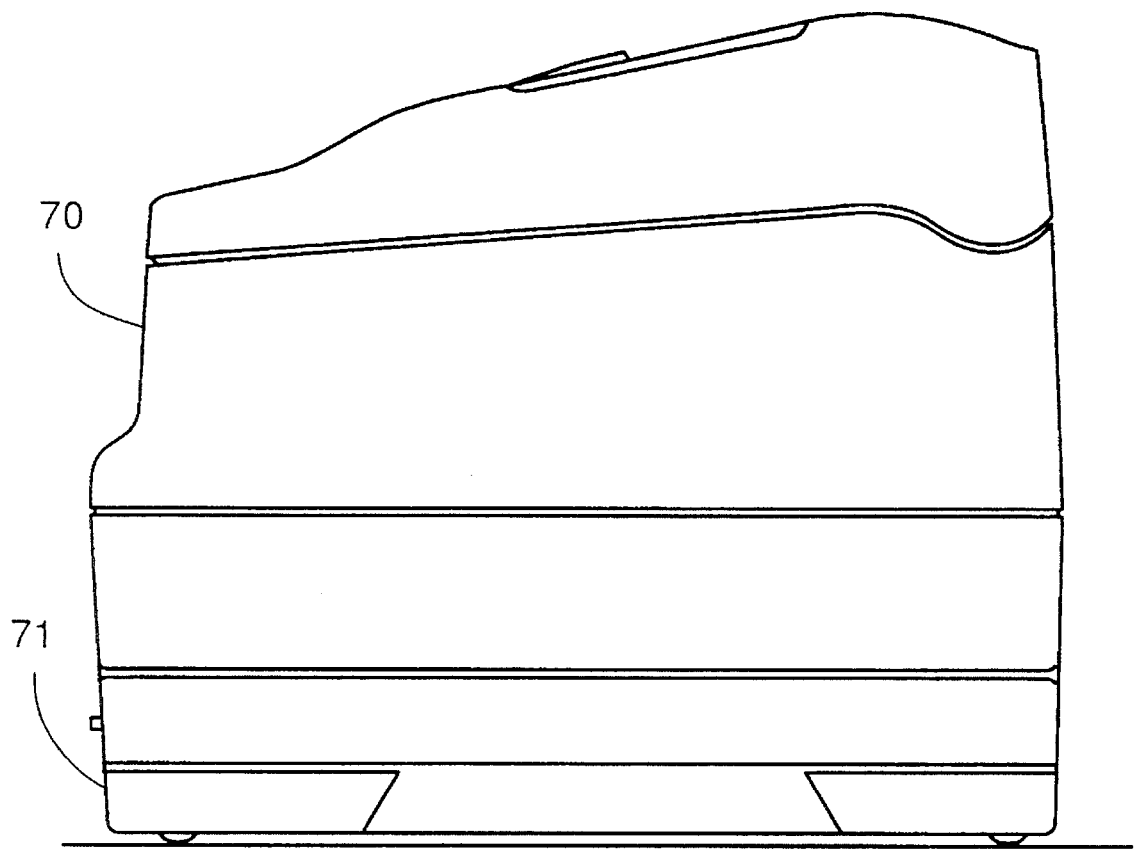
FIG. 3 is a side view showing an exterior of the PC-POS terminal FIG. 1.

FIG. 1 is a block diagram showing the configuration of a PC-POS terminal in accordance with the present invention, FIG. 2 is a front-view showing the exterior thereof and FIG. 3 is a side-view diagram. Referring to FIG. 1, printer 10 is a conventional POS printer capable of interfacing with a PC unit 11. The PC-POS terminal control unit comprising a general-purpose PC unit 11 such as, an IBM-PC compatible or Apple Macintosh computer. These PC's are controlled by an operating system, such as MSDOS® by Microsoft or System 7® by Apple, respectively. Printer 10 and PC unit 11 exchange signals on a TTL level, instead of a general-purpose interface, such as an asynchronous port or also known as RS-232C protocol of the PC unit. In the preferred embodiment TTL signaling uses a similar protocol as the RS-232C protocol.

PC unit 11 is generally a conventional PC known to one ordinary skill in the art and comprises among other components, a CPU 20, a standard bus, such as an ISA bus connector 21 and an expandable connector 22. Typically a communication board, such as a modem, is connected to the ISA bus and components, such as a memory board, are connected to expansion board connector 22.

PC unit 11 also comprises a floppy disk drive 23, a hard disk drive 24 including an access light 25, a serial or RS232C level port and accompanying serial connector 27, a CRT output connector 28, a power supply 29, a power supply light 30, a backup power supply 31, keyboard connector 32, a power switch 33, a cash drawer 34 and a display module 35, since these components are found in a typical personal computer no further discussion is required. A common power supply 36 supplies power to both printer 10 and PC 11. The PC-POS may include a currency drawer 34 and display module 35.

As shown in FIGS. 2 and 3, printer 10 and PC module 11 are housed inside their own body frames, and become integrated when these body frames are connected. Note that PC unit 11 is detachable. Although, in this embodiment, PC module 11 can be detached from printer 10 through a drawer-type arrangement, it is possible to use a configuration in which printer 10 is placed on top of PC unit 11 in a detachable manner.

When PC unit 11 is detached, the general-purpose interface connector of printer 10 becomes exposed, as will be described in detail hereinbelow. By connecting a display module or a connection cable from another PC to this interface connector, the printer can be used in a conventional manner.

Figure 4:
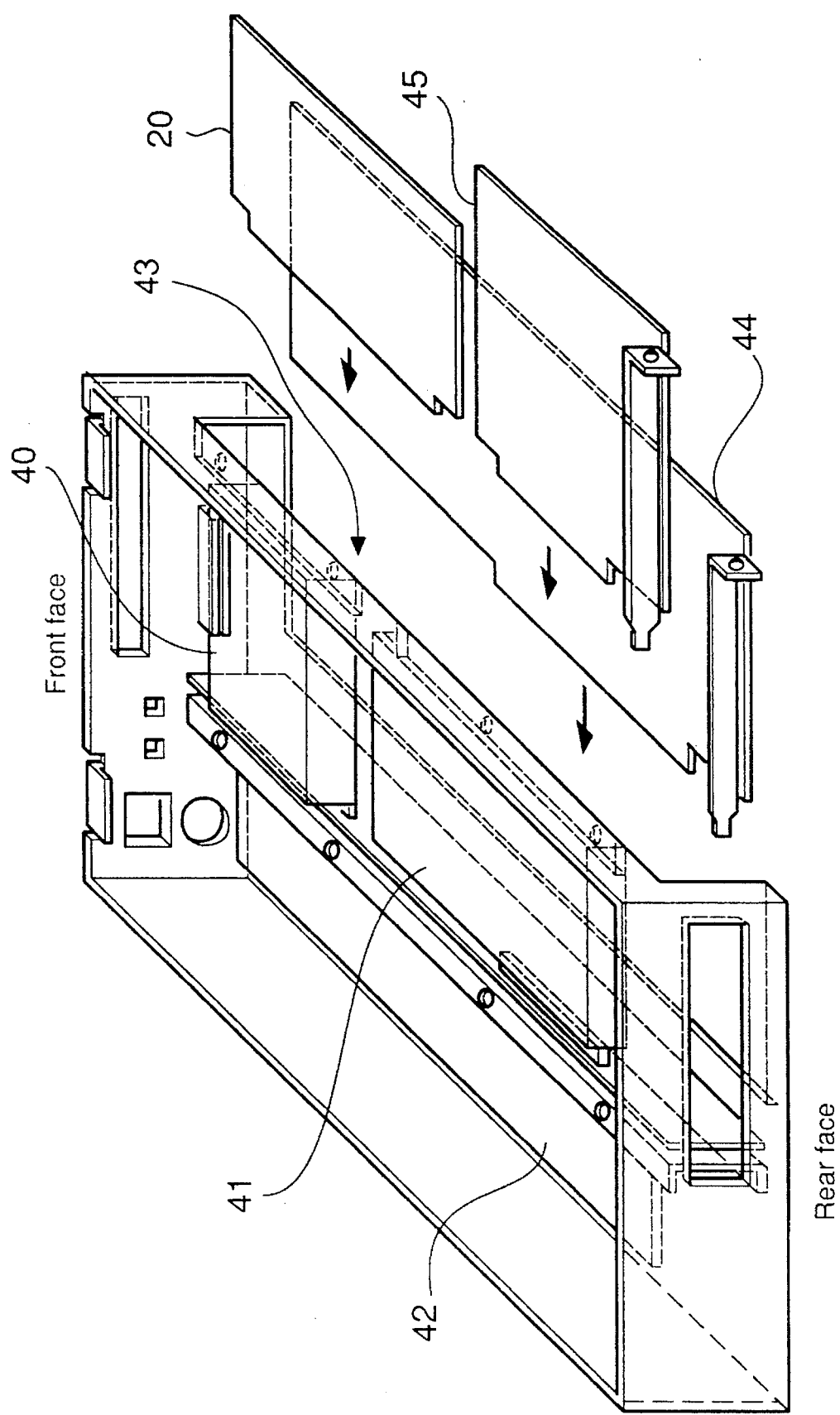
FIG. 4 is a perspective view of the various components inside the PC-POS terminal of FIG. 1.

FIG. 4 shows the relative positions of the components of PC module 11. In this figure, 40 is the location at which floppy disk drive 23 is to be positioned, 41 is the location at which hard disk drive 24 is to be positioned. 42 is the location at which the power supply, etc. are to be positioned, 43 is the location at which CPU board 20, expansion I/O board 44 to be connected to ISA bus connector 21, and expansion I/O board 45 to be connected to expansion board connector 22 are to be positioned. The arrows in FIG. 4 indicate the directions in which various boards are inserted. In other words, ISA bus connector 21 (not shown in the figure) is installed on the side wall on which expansion I/O board 44 is to be installed inside PC module 11 as shown in FIG. 4. When expansion I/O board 44 is installed face up, its connector is exposed through the opening on the side wall (back face) that is perpendicular to the side wall on which expansion I/O board 44 is to be installed.

As will be appreciated to one of ordinary skill in the art, CPU board 20 and expansion board connector 22 can be installed in any appropriate directions other than those shown in FIG. 4. Note that the expansion I/O board to be connected to ISA bus connector 21 is positioned as shown in FIG. 4, so as to expose the connector of the expansion I/O board on the back side, and to allow easy operation of dip switches, etc.

The operation of this embodiment is now explained. The data processed by PC unit 11 is sent as a TTL level signal to printer 10 where it is printed. The data from PC unit 11 also passes through printer 10 and is sent to display module 35, where it is displayed. In this case, the device selection data sent along with the data from PC module 11 determines whether the data is to be printed by printer 10 or to be displayed by display module 35.

Printer 10 of this embodiment is explained below.

Figure 5:
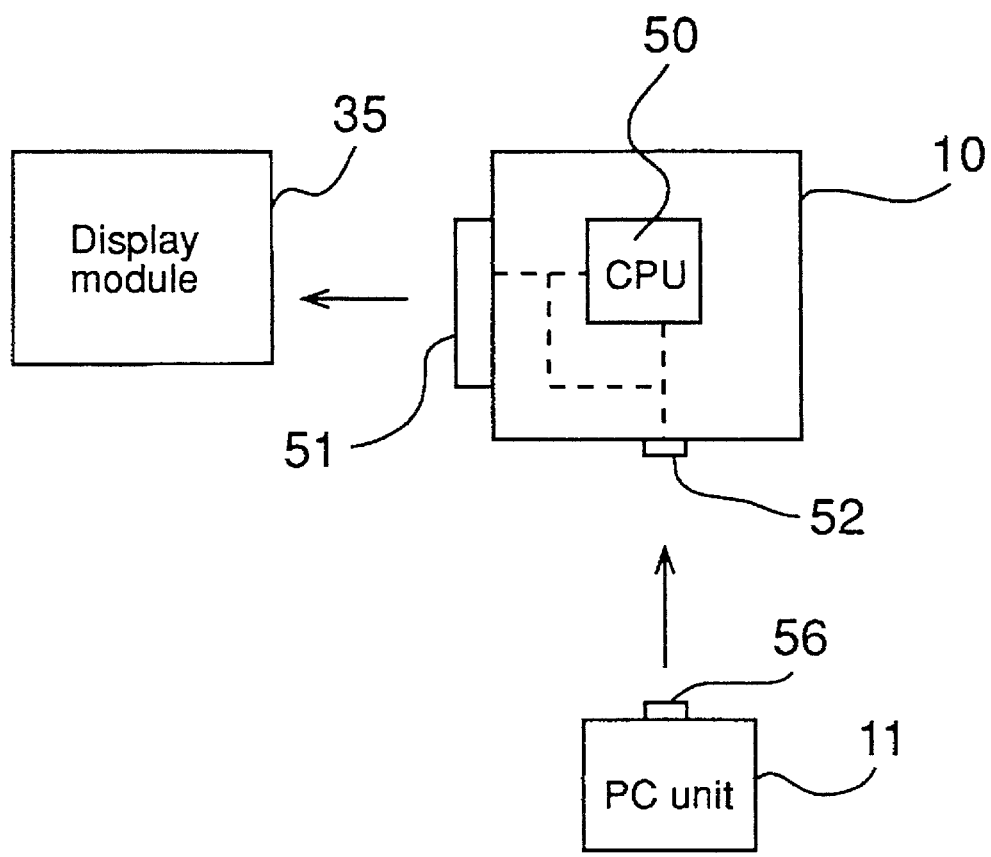
FIG. 5 is a diagram showing the flow of data in a printer of an embodiment of the present invention.
Figure 13:
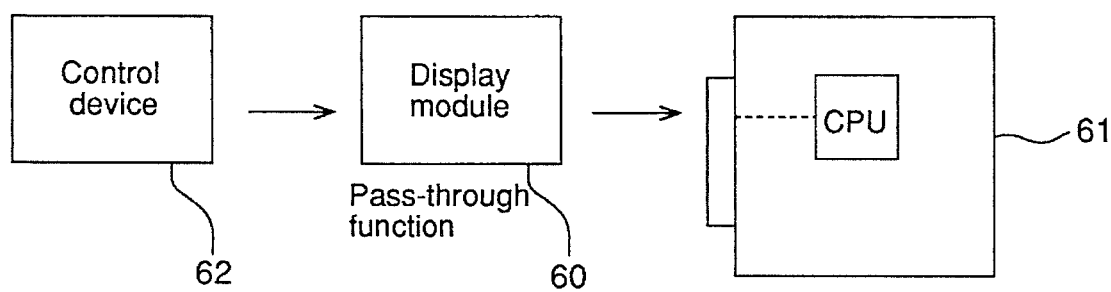
FIG. 13 is a block diagram showing the configuration of a conventional POS terminal.

FIG. 5 shows the flow of the data of printer 10 in this embodiment. Printer 10 comprises a CPU 50, which controls printer 10, a general-purpose interface connector 51 which is used when the printer is not connected to PC unit 11, and a connector 52 for connecting PC unit 11. PC unit 11 also comprises a connector 56 for connecting PC unit 11 to printer 10. If PC unit 11 is connected to printer 10, data from PC unit 11 will be input to printer 10, and the data will be sent to CPU 50 inside printer 10 and to display module 35 connected to connector 51. The data will then be either displayed on display module 35 or printed by printer 10. If PC unit 11 is not connected to printer 10, printer 10 may be connected in a conventional manner as shown in FIG. 13, and data received by connector 51 will be printed.

Figure 6:
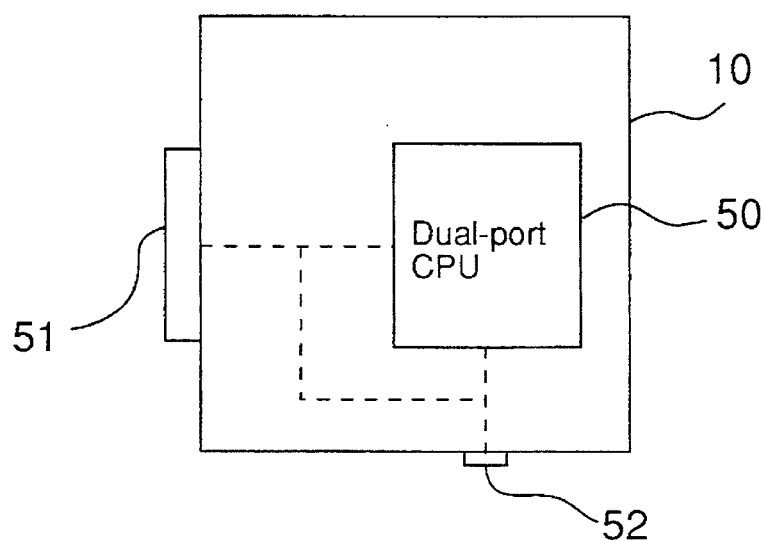
FIG. 6 is a schematic diagram of the printer of the embodiment of the present invention.
Figure 7:
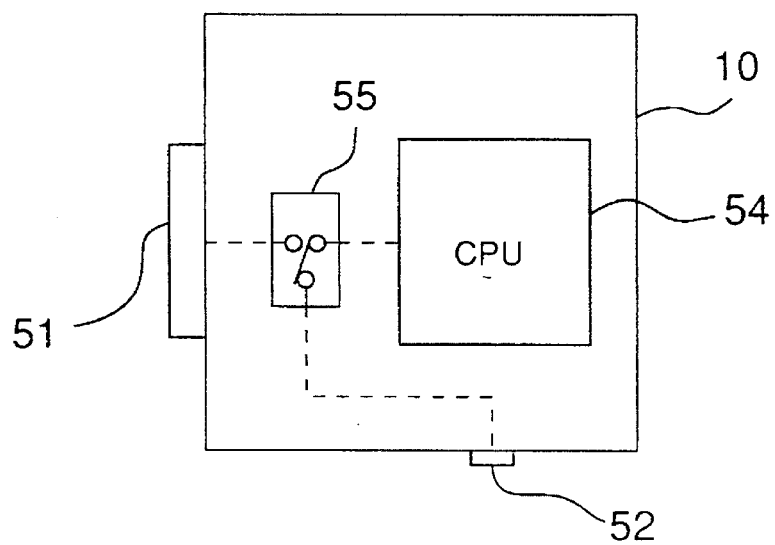
FIG. 7 is a schematic diagram of the printer of an alternate embodiment of the present invention.

FIGS. 6 and 7 show schematic diagrams of two embodiments of printer 10 shown in FIG. 5. In FIG. 6, printer 10 comprises a dual-port CPU 50 for connection to PC unit 11 and display module 35. FIG. 7 shows an alternate embodiment in which printer 10 comprises a single I/O port CPU 54 and a data-selection switch 55 for selecting the PC unit 11 or display module 31.

Referring to FIG. 6, printer 10 comprises dual-port CPU 50 which possesses two I/O ports for data exchange. When PC unit 11 is connected, printer 10 verifies that PC unit 11 is connected thereto, and outputs data such as a busy signal through connector 51 to prevent data from being input through connector 51 into CPU 50 by the display module.

Figure 14:
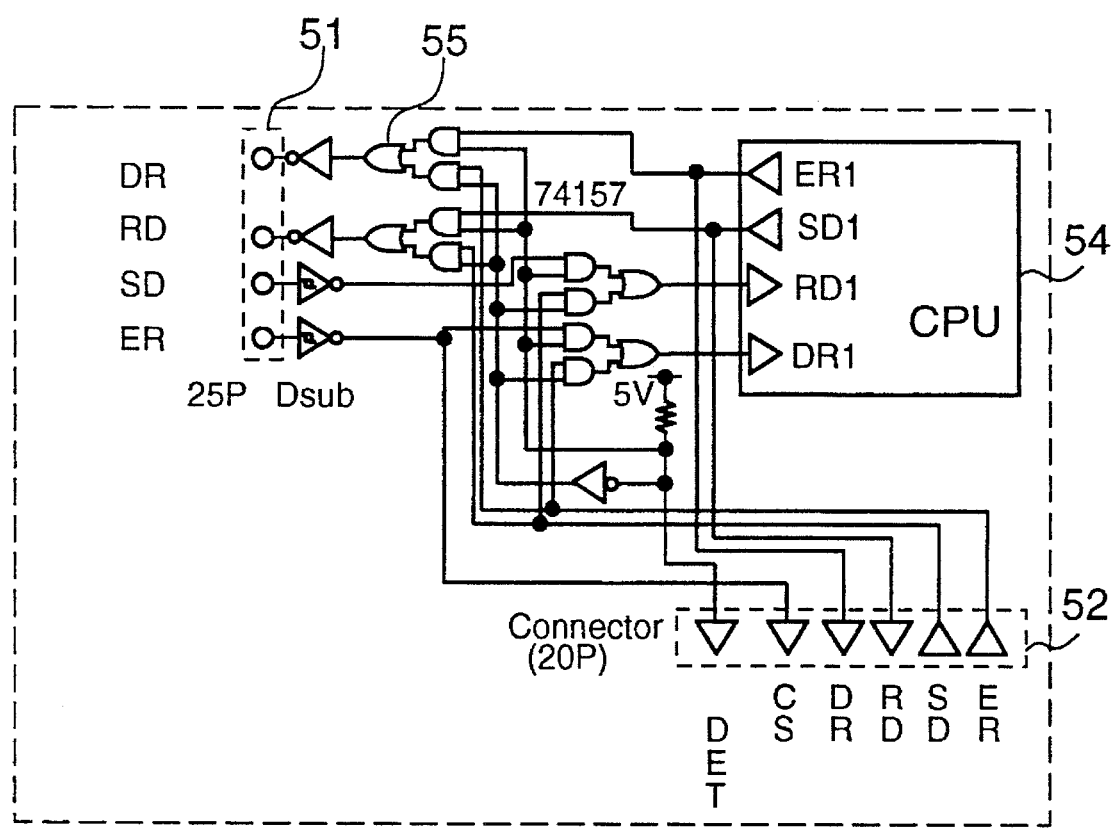
FIG. 14 is a schematic diagram of the embodiment of FIG. 7.

Printer 10, shown in FIG. 7, uses data switch 55 and CPU 54 for data exchange. When PC unit 11 is connected, printer 10 uses switch 55 to prevent data from being input through connector 51 into CPU 54. An example of this embodiment is shown in the schematic diagram of FIG. 14.

Figure 8:
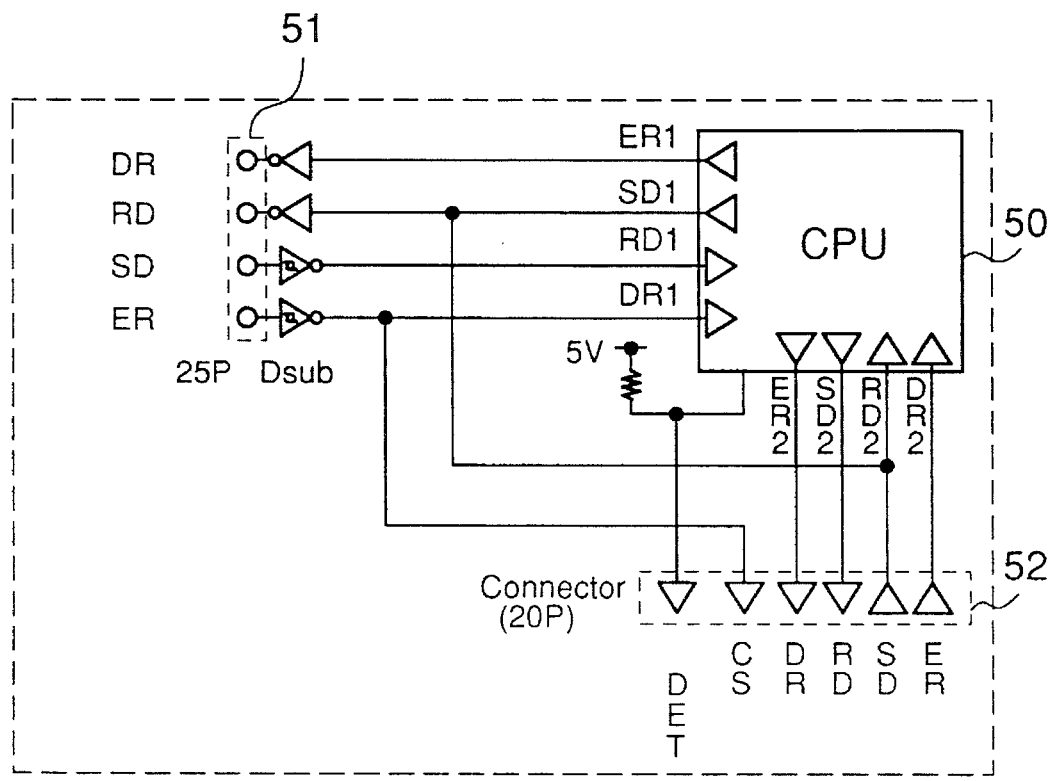
FIG. 8 is a diagram showing the configuration of the data input/output relationship of the printer in accordance with the present invention.
Figure 9:
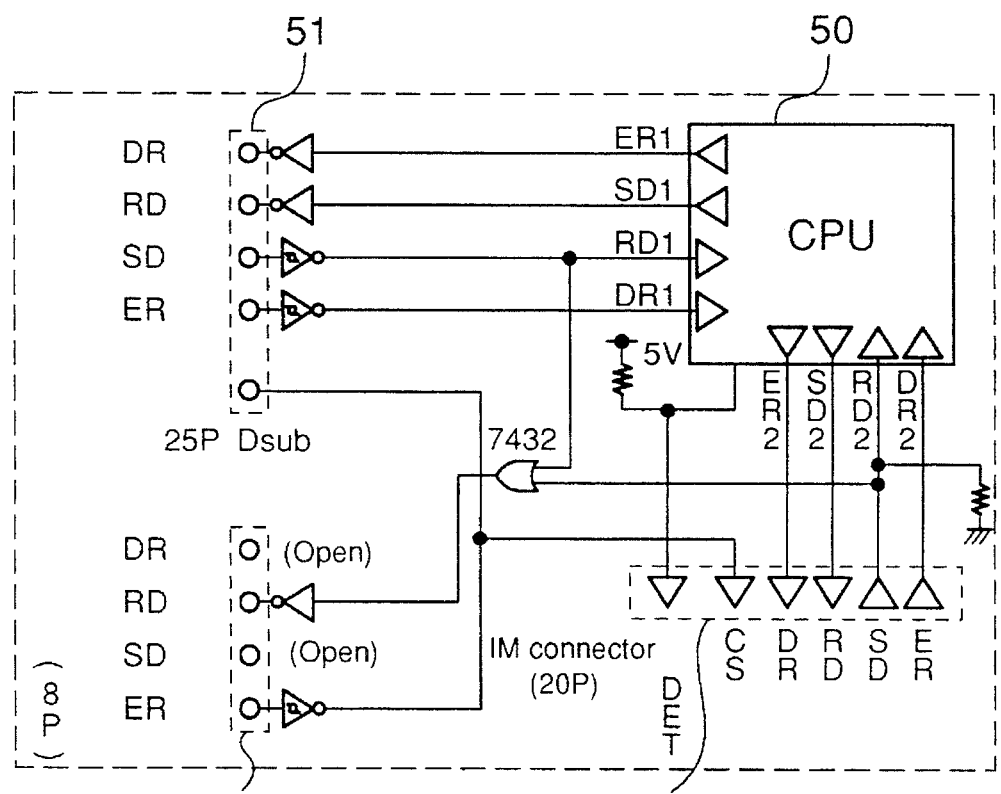
FIG. 9 is a diagram showing another configuration of the data input/output relationship of the printer in accordance with the present invention.

FIG. 8 depicts the configuration of the data input/output relationship of printer 10 shown in FIG. 6. FIG. 9 shows another configuration of the data input/output relationship of printer 10 shown in FIG. 6. In FIG. 9, a connector 57 is provided for connecting the printer to display module 35, and this display module 35 possesses only one connector for data input/output, resulting in a simpler structure and less cost than conventional display module 60. In FIG. 9, connector 51 may be directly connected to control unit 62.

The interface shown in these figures is similar to the RS232C protocol, a type of serial interface. Signal names and their functions are described below.

DR (Data Set Ready): Control signal indicating that the sending side is ready

RD (Receive Data): Receive serial data

SD (Send Data): Send serial data

ER (Equipment Ready): Control signal indicating that the receiving side is ready CS (Clear To Send): Control signal from the receiving side to the sending side authorizing data transmission In printer 10 shown in FIG. 8, a DET pin is provided in connector 52 for verifying connection of PC unit 11 to printer 10. Thus, when a PC unit is connected to connector 52, the DET pin of connector 52 becomes grounded and CPU 50 detects that PC unit 11 is connected to connector 52. When PC unit 11 is connected, CPU 50 sets ER1 to inactive, thus preventing data from being output by another control device even when said other control device is connected to connector 51.

Send serial data SD of PC unit 11 is also connected to the Receive serial data RD pin of connector 51. Thus, when a display module is connected to connector 51, data such as display data can be sent from PC unit 11 to the display module. In this case, PC unit 11 can use the CS signal to determine whether or not the display module is ready to receive the data.

As shown in FIG. 9, it is possible to provide in printer 10, connector 57 dedicated for display module 35. In this case, data can be displayed on display module 35 connected to connector 57, either when PC unit 11 is connected to connector 52, or when data is input through connector 51 from control unit 62 in a conventional manner.

First, an explanation is now provided for a case in which a control device is connected to connector 51 to input data. When sending data to printer 10, the control device sends data to be printed through SD after confirming that DR is active, indicating that the printer is ready to receive data. When sending data to a display module connected to connector 57, the control device sends data through SD after confirming that CS is active. The transmitted data goes through an OR gate 7432 and to RD of display module 35 for displaying or processing the data. Data transmission is executed in the same way when PC unit 11 is connected to connector 52. Note that simultaneous transmission of data from connector 51 and connector 52 is not permitted in this configuration. Otherwise, the transmitted data would be mixed in OR gate 7432, resulting in to the possibility of incorrect data being input into the display module 35 connected to connector 57.

In this configuration SD of connector 52 is pulled down by a resistor, in order to prevent the output of OR gate 7432 from being fixed at a high voltage level when PC unit 11 is not connected.

As explained above, in this embodiment, printer 10 and PC unit 11 are connected using TTL-level signals, connector 52 used for connecting PC unit 11 to printer 10 and connector 51 used for connecting an external device are installed, and PC unit 11 can be connected to or detached from printer 10. Thus, when PC unit 11 is connected to connector 52, data input from connector 51 is disabled. Furthermore, the configuration allows the printing of data that comes in from control unit 62 through connector 51 when PC unit 11 is not connected to connector 52. This configuration facilitates the replacement of printer 10 or PC unit 11. Additionally, the PC-POS terminal can be made compact by stacking printer 10 on top of PC unit 11.

Figure 10:
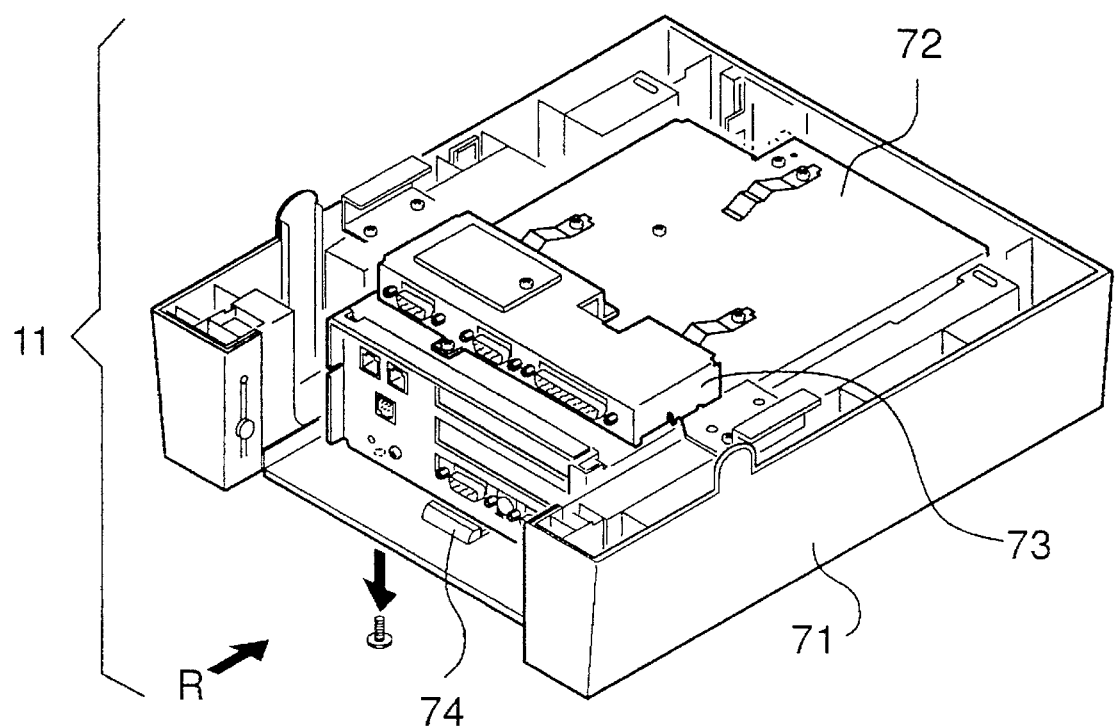
FIG. 10 is a perspective view showing the top of the PC unit of the present invention.

FIG. 10 is a perspective view of PC unit 11. In this figure, arrow R indicates the rear side of PC unit 11. PC unit 11 consists of preferably plastic case 71 and metallic shield case 72 which houses the functional components discussed with respect to FIG. 1. Shield case 72 can be pulled out from case 71 in the rearward direction, i.e., the direction opposite arrow R, by pressing down retention hook 74. Connector 73 protrudes from shield case 72, thus expanding the connector space on the back of the shield case. This connector 73 is accommodated inside printer connector room 75 shown in FIG. 11, when printer 10 is placed on top of PC unit 11. In this way, connector 51 used for connecting printer 10 with control unit 62 is shielded, thus preventing printer 10 from being connected to control unit 62 when it is connected to PC unit 11.

Figure 11:
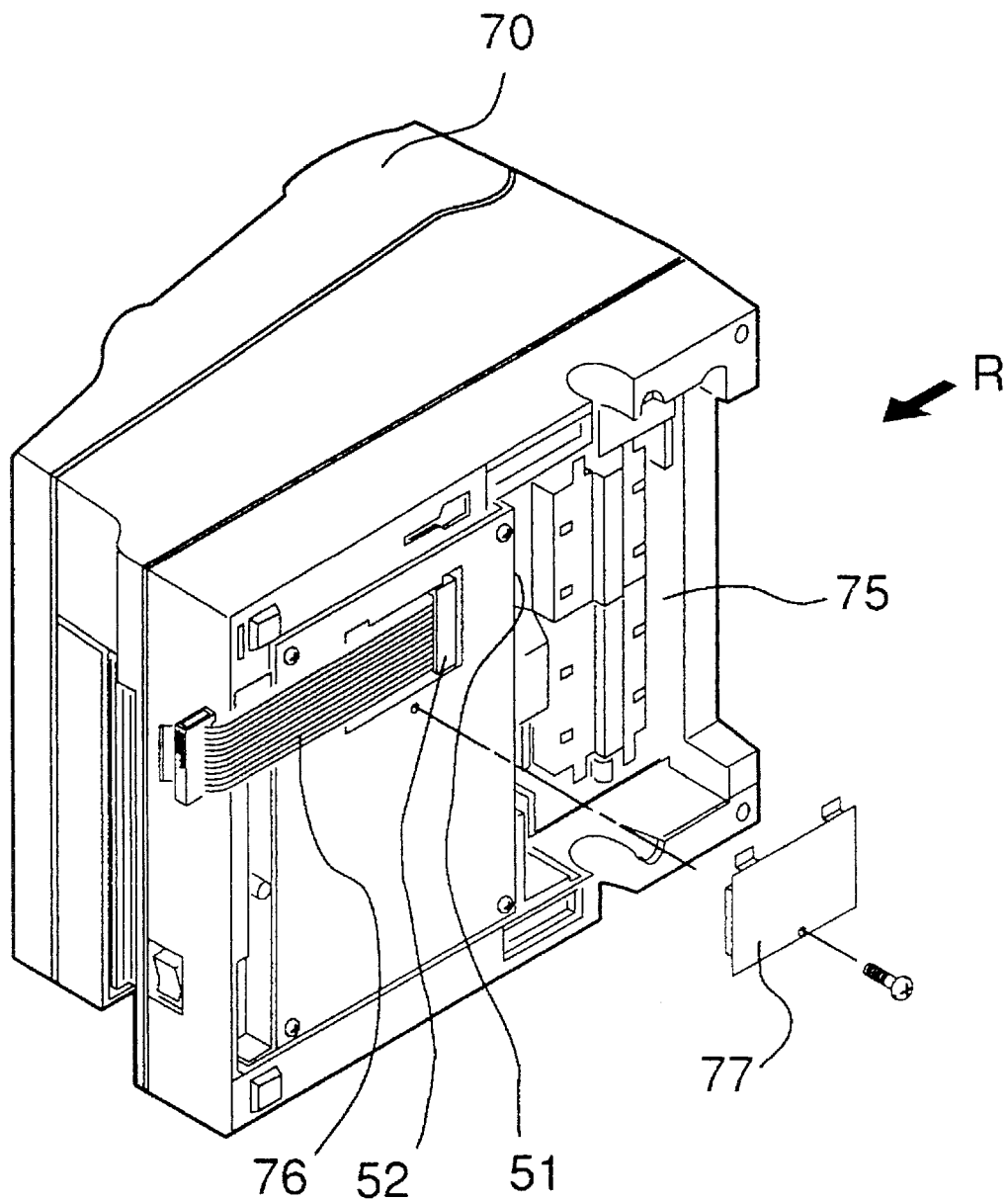
FIG. 11 is a perspective view showing the bottom of the printer of the present invention.

FIG. 11 is a perspective view of printer 10 when viewed from the bottom side. Arrow R indicates the side that faces the rear when printer 10 is connected to PC unit 11. Connector 52 for connecting to PC unit 11 is installed on the bottom surface of printer 10, which is connected to connector 56 on the PC unit 11 side, shown in FIG. 12, via flat cable 76. Note that the hole through which flat cable 76 is led out from connector 52 is sealed inside shield cover 77 to prevent the electromagnetic noise emitted by printer 10 from affecting PC unit 11.

Figure 12:
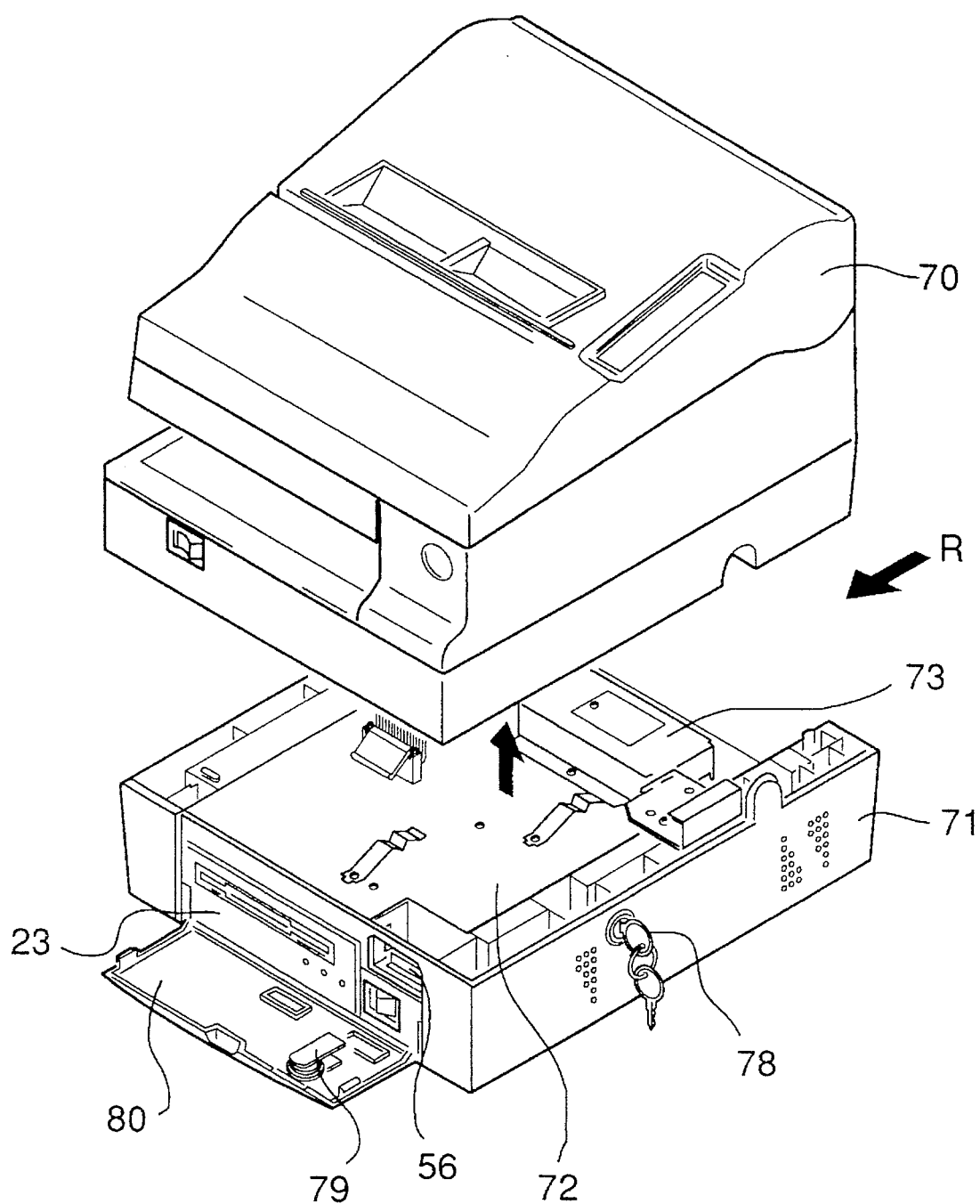
FIG. 12 is a perspective view showing the state in which the printer and PC unit of the present invention have been separated.

FIG. 12 is a perspective view in which printer 10 has been detached from PC unit 11. To detach printer 10 in this way, the lock of the connection device must be unlocked using master key 78. The same master key 78 can be used to release bezel lock 79 which prevents the opening of front bezel 80. When front bezel 80 is released, it becomes possible to insert a disk into or remove it from floppy disk drive 23. Furthermore, in this state, shield case 72 can be pulled out from case 71 in the rearward direction, i.e., direction opposite arrow R, by pressing down retention hook 74. Therefore, it is possible using only master key 78, to control all important replacement operations related to a PC-POS terminal, e.g., printer replacement, PC unit replacement, and replacement of software to be executed by the PC unit. This improves both the maintainability and safety of the equipment.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A point-of-sale terminal comprising:

a printing apparatus;

a control device for sending at least one of control and print data to said printing apparatus comprising:

a general purpose processor controlled by a general purpose operating system, and a control device connection means for connecting said control device to said printing apparatus, wherein said printing apparatus comprises:

first connection means for connecting said printing apparatus to said control device through said control device connection means, second connection means for connecting said printing apparatus to an external device, and processing means for processing first data input from said first connection means and second data input from said second connection means, wherein said first connection means is in communication with said second connection means;

a housing comprising:

a first body frame for accommodating said printing apparatus, and a second body frame for accommodating said control device, said first body frame being detachably mounted on said second body frame; and verifying means for detecting if said first connection means is electrically connected to said control device connection means, wherein said processing means selectively processes said first data, when said verifying means detects that said first connection means is electrically connected to said control device connection means, and wherein said processing means selectively processes said second data when said verifying means detects that said first connection means is not electrically connected to said control device connection means.

2. A point-of-sale terminal according to claim 1, wherein said printing apparatus further comprises:

a data transfer means for transferring data input from said first connection means to said second connection means.

3. A point-of-sale terminal according to claim 1, wherein said second body frame has a protruding section on the upper portion, wherein said protruding section prohibits said second connection means from connecting to the external device when said first body frame is mounted on said second body frame.

4. A point-of-sale terminal according to claim 3, further comprising a display means for outputting data from one of said control device and the external device, wherein the printing apparatus further comprises:

a third connection means for connecting said display means to said printing apparatus, and a data transfer means for transferring data input from said first connection means to said third connection means.

5. A printing apparatus for a point-of-sale terminal, comprising:

first connection means for exchanging first data including at least one of printing data and control data with a first external device;

second connection means for exchanging second data including at least one of printing data and control data with a second external device;

verifying means for detecting if said second connection means is electrically connected to said second external device; and data processing means for selectively processing said second data if said verifying means detects that said second connection means is electrically connected to said second external device, and for selectively processing said first data if said verifying means detects that said second connection means is not electrically connected to said second external device, wherein said printing apparatus is detachably mounted to said second external device.

6. The printing apparatus of claim 5, wherein said data processing means comprises a microprocessor including a plurality of communication ports including a first port in communication with said first connection means and a second port in communication with said second connection means.

7. The printing apparatus of claim 6, wherein said verifying means comprises a connection detection signal generator in parallel electrical communication with said first connection means and said microprocessor for selectively issuing a connection detection signal to said second connection means and said microprocessor, the connection detection signal having a variable signal level responsive to a state of electrical connection between said second connection means and said second external device; and wherein said microprocessor further comprises a signal input in communication with said connection detection signal generator for receiving the connection detection signal.

8. The printing apparatus of claim 5, wherein said data processing means comprises:

a microprocessor having a communications port; and switching means in communication with said microprocessor and said first and second connection means for selectably switching at least one of said first and second connection means into communication with said communications port according to detection of electrical connection between said second external device and said second connection means.

9. The printing apparatus of claim 8, wherein said verifying means comprises a connection detection signal generator in parallel electrical communication with said second connection means and said microprocessor for selectively issuing a connection detection signal to said second connection means and said microprocessor, the connection detection signal having a variable signal level responsive to a state of electrical connection between said second connection means and said second external device.

10. The printing apparatus of claim 8, wherein said switching means switches said first and second connection means into mutual communication and transfers first data received by said first connection means to said second connection means when said second external device and said second connection means are electrically connected.

11. A point-of-sale terminal, comprising:

a control device having a control device connection means;

a printing apparatus in releasable communication with said control device, comprising:

a first connection means for electrically connecting said printing apparatus to said control device connection means and exchanging at least one of control and print data between said printing apparatus and said control device;

second connection means for electrically connecting said printing apparatus to an external device; and processing means in communication with said first and second connection means for processing first data received by said first connection means and second data received by said second connection means;

a housing including a first body frame for releasably securing said printing apparatus and an adjacent second body frame for releasably securing said control device; and verifying means for detecting if said first connection means is electrically connected to said control device connection means, wherein said processing means selectively processes said first data when said verifying means detects that said first connection means is electrically connected to said control device connection means, and wherein said processing means selectively processes said second data when said verifying means detects that said first connection means is not electrically connected to said control device connection means.

12. The point-of-sale terminal of claim 11, wherein said processing means comprises a microprocessor including a plurality of communication ports including a first port in communication with said first connection means and a second port in communication with said second connection means.

13. The point-of-sale terminal of claim 12, wherein said verifying means comprises a connection detection signal generator in parallel electrical communication with said first connection means and said microprocessor for selectively issuing a connection detection signal to said first connection means and said microprocessor, the connection detection signal having a variable signal level responsive to a state of electrical connection between said first and control device connection means; and wherein said microprocessor further comprises a signal input in communication with said connection detection signal generator for receiving the connection detection signal.

14. The point-of-sale terminal of claim 11, wherein said processing means comprises:

a microprocessor having a communications port; and switching means in communication with said microprocessor and said first and second connection means for selectably switching at least one of said first and second connection means into communication with said communications port according to detection of electrical connection between said control device and first connection means.

15. The point-of-sale terminal of claim 14, wherein said verifying means comprises a connection detection signal generator in parallel electrical communication with said first connection means and said microprocessor for selectively issuing a connection detection signal to said first connection means and said microprocessor, the connection detection signal having a variable signal level responsive to a state of electrical connection between said first and control device connection means.

16. The point-of-sale terminal of claim 14, wherein said switching means switches said first and second connection means into mutual communication and transfers first data received by said first connection means to said second connection means when said control device and first connection means are electrically connected.

17. A point-of-sale terminal, comprising:

a printing apparatus;

a control device comprising a control device connection means for electrically connecting said control device to said printing apparatus through which at least one of control and print data is sent to said printing apparatus, wherein said printing apparatus comprises:

first connection means for electrically connecting said printing apparatus to said control device through said control device connection means, second connection means for electrically connecting said printing apparatus to an external device, and processing means for processing first data input from said first connection means and second data input from said second connection means;

a housing comprising:

a first body frame for accommodating said printing apparatus, and a second body frame for accommodating said control device, said first body frame being detachably mounted on said second body frame;

wherein said second body frame includes a prohibiting means for prohibiting said second connection means from connecting to the external device when said first body frame is mounted on said second body frame.

* * * * *